United States Patent
McGann et al.

(10) Patent No.: US 10,233,953 B1
(45) Date of Patent: Mar. 19, 2019

(54) CONNECTOR FOR NON-CYLINDRICAL COMPOSITE TUBING AND METHODS FOR MAKING THE SAME

(71) Applicant: The United States of America as Represented by the Secretary of the Navy, Washington, DC (US)

(72) Inventors: Shawn Kerry McGann, Ridgecrest, CA (US); Nicholas McGaha, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/819,938

(22) Filed: Nov. 21, 2017

Related U.S. Application Data (63) Continuation-in-part of application No. 15/486,988, filed on Apr. 13, 2017, which is a continuation-in-part of application No. 15/486,481, filed on Apr. 13, 2017.

(51) Int. Cl.
*F16B 5/02* (2006.01)
*F16B 11/00* (2006.01)
(Continued)

(52) U.S. Cl.
CPC ............. *F16B 5/02* (2013.01); *F16B 11/006* (2013.01); *B29C 65/48* (2013.01); *B29C 65/561* (2013.01);
(Continued)

(58) Field of Classification Search
CPC .......... F16B 5/02; F16B 11/006; B29C 65/48; B29C 65/561; B29C 66/022;
(Continued)

(56) References Cited

U.S. PATENT DOCUMENTS 3,349,237 A   10/1967  Jackson
8,262,825 B2   9/2012  Fahey et al.
(Continued)

OTHER PUBLICATIONS

Barkhimer et al. Effect of Time Delay Between Etching and Adhesive Bonding ("Outlife" Time) on Lap-Shear Strength . . . , Cal Poly San Lius Obispo, Jun. 6, 2015, United States.

*Primary Examiner* — Anita K Alanko
(74) *Attorney, Agent, or Firm* — Jimmy M. Sauz (57) ABSTRACT

A connector for non-cylindrical composite tubing and methods for making the same. The method may involve assembling a connector for a non-cylindrical composite tubing by loosely fastening a pair of bonding plates to an end plate; arranging the bonding plates in an inward configuration; applying an epoxy adhesive onto the outer faces of the bonding plates, inserting the bonding plates into the open end of the composite tubing, inserting the bonding plate fasteners through the through-holes of the composite tubing and tightly fastening the bonding plate fasteners into the bonding plates until the bonding plates engage against the inner surface of the composite tubing until the epoxy adhesive is uniformly distributed. The method may also include steps of removing the bonding plate screw fasteners and adding shims between each bonding plate and the inner surface of the composite tubing in order to maintain a predetermined thickness of the epoxy adhesive.

11 Claims, 10 Drawing Sheets

(51) Int. Cl.
    *C23F 1/20*     (2006.01)
    *C23G 1/00*     (2006.01)
    *B29C 65/00*     (2006.01)
    *B29C 65/48*     (2006.01)
    *B29C 65/56*     (2006.01)

(52) U.S. Cl.
    CPC .......... *B29C 66/022* (2013.01); *B29C 66/026* (2013.01); *B29C 66/5221* (2013.01); *C23F 1/20* (2013.01); *C23G 1/00* (2013.01); *Y10T 403/472* (2015.01)

(58) Field of Classification Search
    CPC ..... B29C 66/5221; B29C 66/026; C23F 1/20; C23G 1/00; Y10T 403/472
    See application file for complete search history.

(56) References Cited

U.S. PATENT DOCUMENTS

| | | | | |
|---|---|---|---|---|
| 2009/0202294 A1* | 8/2009 | Apfel | ........................ | F16B 5/02 403/267 |
| 2011/0192528 A1* | 8/2011 | Kozaki | ................ | B29O 53/585 156/173 |
| 2015/0367565 A1* | 12/2015 | Koncz | .................... | B64O 1/068 264/271.1 |

* cited by examiner

CONNECTOR FOR NON-CYLINDRICAL COMPOSITE TUBING AND METHODS FOR MAKING THE SAME

CROSS-REFERENCE TO RELATED APPLICATIONS

This application claims the benefit under 35 U.S.C. § 120 as a continuation-in-part patent application of the commonly owned, U.S. non-provisional patent application Ser. No. 15/486,988, titled "Launcher for an Unmanned Aircraft" filed on Apr. 13, 2017 by co-inventors Shawn Kerry McGann, Nicholas McGaha, and Alvin L. Quintana, the contents of which are hereby expressly incorporated herein by reference in its entirety. This application also claims the benefit under 35 U.S.C. § 120 as a continuation-in-part patent application of the commonly owned, U.S. non-provisional patent application Ser. No. 15/486,481, titled "Launcher for an Unmanned Aircraft and Methods of Use Thereof" filed on Apr. 13, 2017 by co-inventors Shawn Kerry McGann, Nicholas McGaha, and Alvin L. Quintana, the contents of which are hereby expressly incorporated herein by reference in its entirety.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The invention relates generally to connectors for composite materials, and, more particularly, to connectors and attachment mechanisms for premanufactured non-round composite tubing for launchers of unmanned aircraft.

It is to be understood that the foregoing general description and the following detailed description are exemplary and explanatory only and are not to be viewed as being restrictive. Further advantages will be apparent after a review of the following detailed description of the disclosed embodiments, which are illustrated schematically in the accompanying drawings and in the appended claims.

DETAILED DESCRIPTION OF THE ILLUSTRATIVE EMBODIMENTS

The present disclosure relates generally to connectors for composite tubing, and more particularly, to methods of assembling and installing connectors with attachment points to premanufactured non-cylindrical composite tubing. In particular, when building a unmanned aerial vehicle (UAV) launcher, various components may include premanufactured composite materials due to their load strength, fatigue resistance, and lightweight characteristics. Composite tubing, for example, may be used for launch rails and various frame members for the UAV launcher. Modifying composite tubing to create attachment points, however, may be challenging, as composite components are generally premanufactured without connectors and points of attachment. Importantly, some composite tubing may be manufactured with some irregularities such as bends or bowed areas, thereby creating inconsistencies due to the winding process.

The embodiments disclosed herein solve this problem by (1) adhering bonding plates to the inner surface of an open end of the composite tubing via an epoxy adhesive that is uniformly distributed and (2) coupling an end plate to the bonding plates, wherein the end plate comprises one or more attachment points. The bonding plates may aid in flattening the bended or bowed areas of the composite tubing. Moreover, the end plate may have one or more attachment points such as threaded holes to help couple the composite tubing to other surfaces (e.g., extension of the launch rail for the UAV launcher). Thus, the embodiments disclosed herein generally aid in the assembling and installation of connectors for composite tubing for UAV launchers and help mend manufacturing defects. Additionally, the embodiments preferably reduce manufacturing costs, facilitate quick installation, and allow flexibility in adjusting the shear strength based on a desired predetermined thickness of the bond line of the epoxy adhesive used for the bonding plates.

In general, the embodiments may comprise: a composite tubing, an end plate, a pair of bonding plates, end plate fasteners, and bonding plate fasteners. The bonding plates may be movably coupled to the end plate in an orthogonal manner via the end plate fasteners to create a connector. The bonding plates of the connector may be adapted to move laterally along slotted holes located on the end plate and may also be disposed in an inward configuration. An epoxy adhesive may also be applied to the outer faces of the bonding plates. The bonding plates of the connector may then be inserted into the open end or cavity of the composite tubing without scraping of the epoxy adhesive. The bonding plate fasteners may be inserted through the through-holes of the composite tubing in order to engage with the bonding plates. This may allow the bonding plates to move outwardly and clamp against the inner surface of the composite tubing upon fastening of the bonding plate fasteners. Shims may also be installed between the bonding plates and the composite tubing in order for the epoxy adhesive to have a predetermined thickness, which generally affects shear strength. In some embodiments, the bonding plate fasteners may be removed thereafter.

Although the following embodiments are described in considerable detail, including references to certain versions thereof, other versions are possible such as, for example, orienting and/or attaching components in different fashion. Therefore, the spirit and scope of the appended claims should not be limited to the description of versions included herein.

In the accompanying drawings, like reference numbers indicate like elements. Reference character 200, for example, generally refers to a non-cylindrical composite tubing, according to some embodiments. Reference character 100 generally refers to a connector for the non-cylindrical composite tubing. Other variations, of course, are possible without detracting from the merits or generalities of the embodiments.

In the following description, certain terminology is used to describe certain features of one or more embodiments. For example, as used herein, the term "composite" generally refers to layers of reinforcing material bonded together with a matrix. The combination of a binding matrix material and reinforcing material generally provides better qualities when compared to traditional materials such as superior strength and lighter in weight. The matrix material can comprise any suitable binding material, including without limitation, thermosetting resins such as epoxy or polyester resins, or certain thermoplastic materials.

Figure 1:
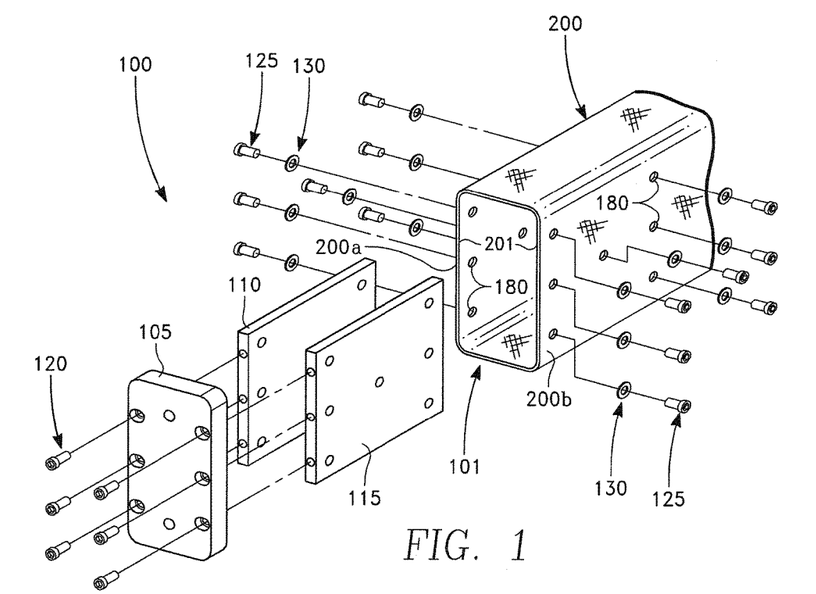
FIG. 1 is an exploded, perspective view of a connector for a non-cylindrical composite tubing, according to some embodiments of the present disclosure.

FIG. 1 is an exploded perspective view of a connector and a non-cylindrical composite tubing, according to some embodiments of the present disclosure. As shown in FIG. 1, the composite tubing 200 may be any non-round or non-cylindrical tubing structure that is substantially hollow and has at least one open end 101. In various embodiments, the composite tubing 200 may be constructed of a combination of a binding matrix material and reinforcing material that provides better qualities when compared to traditional materials such as being stronger, stiffer, and lighter in weight. The matrix material can comprise any suitable binding material, including thermosetting resins (e.g., epoxy or polyester resins) or certain thermoplastic materials. Additionally, reinforcing fiber material may include glass fiber, carbon fiber, and polyethylene. In one embodiment, the composite tubing 200 may be carbon fiber, although the embodiments disclosed herein may be applicable to other variants of composite material and, therefore, should not be construed as limiting.

In various embodiments, the composite tubing 200 may be used for constructing a launch rail mechanism assembly for a UAV launcher. A person having ordinary skill in the art will recognize that the embodiments are applicable to other launcher systems and that the terms "mate," "engage," or the like may also be used to describe the relationship between the interfaces and the composite tubing 200.

Importantly, FIG. 1 shows that one embodiment of the connector 100 for the composite tubing 200 may comprise: an end plate 105, bonding plates 110, 115, end plate fasteners 120, bonding plate fasteners 125, and washers 130. The end plate 105 may be a connecting and terminating unitary piece for the composite tubing 200 and may be constructed of a hard metal such as aluminum. In some embodiments, the end plate 105 may be specifically 7075 aluminum. The end plate 105 may also have an outer cross sectional shape that matches the outer cross sectional shape of the composite tubing 200. In one embodiment, the end plate 105 may conform and terminate the open end 101 of the composite tubing 200.

The end plate 105 may comprise groups of slotted holes 106, 107 (shown in FIGS. 3A and 3B), which may be used for loosely fastening the bonding plates 110, 115 to the end plate 105. This will preferably allow the bonding plates 110, 115 to move inwardly, outwardly, or laterally along the length of the slotted holes 106, 107. Specifically, the end plate 105 may have first slotted holes 106 and second slotted holes 107 for loosely coupling the first bonding plate 110 and second bonding plate 115, respectively, via the end plate fasteners 120. The first slotted holes 106 and second slotted holes 107 may also allow the bonding plates 110, 115 to be moved laterally inwards or outwards before insertion into the composite tubing 200. This may help prevent contact and scraping of any epoxy adhesive 150 (shown in FIGS. 2A and 2B) applied on the outer faces 119, 124 (shown in FIGS. 5A and 5B) of the bonding plates 110, 115 during insertion into the open end 101 of the composite tubing 200. In various embodiments, the slotted holes 106, 107 may comprise counterbores in order for the end plate 105 to sit flush against another flat surface.

Like the end plate 105, the bonding plates 110, 115 may also be a pair of metal pieces such as 7075 aluminum, and each bonding plate 110, 115 may be configured to adhere to an inner surface 201 of the composite tubing 200. In particular, the first bonding plate 110 and the second bonding plate 115 may adhere to an inner surface 201 of the two lateral sides 200a, 200b within the open end 101 of the composite tubing 200 via an epoxy adhesive 150, which may be uniformly distributed. Preferably, the application of the epoxy adhesive 150 has a bond line with a predetermined thickness.

Importantly, each of the bonding plates 110, 115 may have two groups of multiple threaded holes. Specifically, first threaded holes 116, 121 (shown in FIGS. 5A and 5B) may be disposed along a distal lateral face 118, 123 of the bonding plates 110, 115 in order for the bonding plates 110, 115 to moveably couple to the end plate 105 via end plate fasteners 120. Second threaded holes 117, 122, on the other hand, may be arranged on the outer face 119, 124 of the bonding plates 110, 115 in order for the bonding plates 110, 115 to fasten against the inner surface 201 of the composite tubing 200 via the bonding plate fasteners 125. Specifically, after the epoxy adhesive 150 is applied to the outer faces 119, 124 of the bonding plates 110, 115, the bonding plate fasteners 125 may engage with the through-holes 180 of the composite tubing 200 and engage the second threaded holes 117, 122 of the bonding plates 110, 115. In this manner, when the bonding plate fasteners 125 are fastened or tightened, the bonding plates 110, 115 may move outwardly along the length of the slotted holes 106, 107, thereby contacting the inner surface 201 of the composite tubing 200. As a result, the bonding plates 110, 115 may clamp and uniformly distribute the epoxy adhesive 150 onto the inner surface 201 of the composite tubing 200. This in turn can help prevent scraping of the epoxy adhesive 150 during insertion of the connector 100. The epoxy adhesive 150 may also be unifounly and evenly distributed with a predetermined bond line thickness. A person having ordinary skill in the art will recognize that the terms "fastener," "clamp," and "secure" are equally applicable to relation of the bonding plates 110, 115 to the composite tubing 200. Additional details regarding the first threaded holes 116, 121 and second threaded holes 117, 122 are discussed below.

FIG. 1 also shows that the connector 100 may comprise end plate fasteners 120, bonding plate fasteners 125, and washers 130. As discussed above, the end plate fasteners 120 may be used to movably couple the end plate 105 to the bonding plates 110, 115, and the bonding plate fasteners 125 may be used to engage and clamp the bonding plates 110, 115 to the inner surface 201 of the composite tubing 200. Thus, the end plate fasteners 120 and the bonding plate fasteners 125 may be attachment mechanisms for coupling the end plate 110 and the bonding plates 110, 115 to the composite tubing 200. The washers 130 may be used to engage with the bonding plate fasteners 125 to help distribute the pressure or load when the bonding plate fasteners 125 are tightened.

Figure 2:
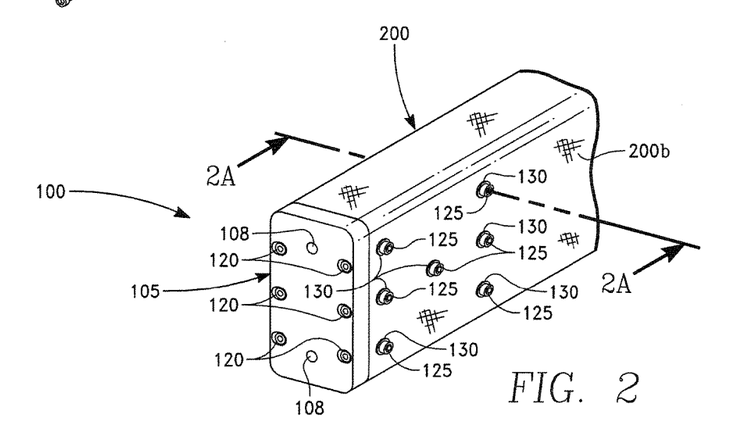
FIG. 2 is an assembled, perspective view of the connector for a non-cylindrical composite tubing, according to some embodiments of the present disclosure.

FIG. 2 is an assembled, perspective view of the connector for a non-cylindrical composite tubing, according to some embodiments of the present disclosure. As shown in FIG. 2, one embodiment of the connector 100 for the composite tubing 200 may comprise: an end plate 105, end plate fasteners 120, bonding plate fasteners 125, and washers 130. FIG. 2 also shows how the outer shape of the end plate 110 may match with the outer cross section of the composite tubing 200.

Figure 2A:
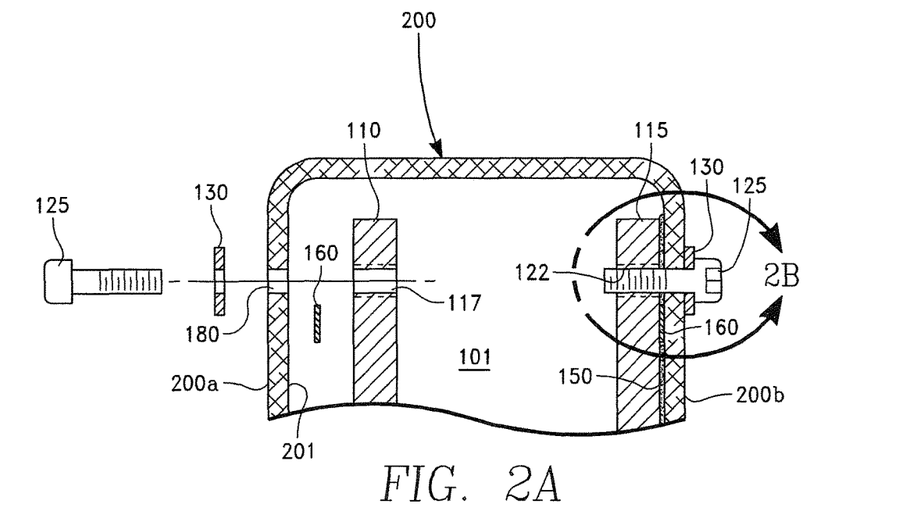
FIG. 2A is an assembled, elevational view of one embodiment of the non-cylindrical composite tubing taken substantially along line 2A-2A of FIG. 2.

FIG. 2A is an assembled, elevational view of one embodiment of the non-cylindrical composite tubing taken substantially along line 2A-2A of FIG. 2. As shown in FIG. 2A, one embodiment of the composite tubing 200 may comprise: bonding plates 110, 115, bonding plate fasteners 125, and washers 130. Importantly, FIG. 2A shows that the connector 100 for the composite tubing 200 may comprise shims 160, which may be strip of materials or wedges that are preferably attached to the inner surface 201 of the composite tubing 200, and the epoxy adhesive 150. The thickness of the shims 160 may be used to maintain a predetermined thickness of the bond line of the epoxy adhesive 150. More importantly, FIG. 2A shows that the composite tubing 200 may be constructed of composite material such as carbon fiber and the like.

Figure 2B:
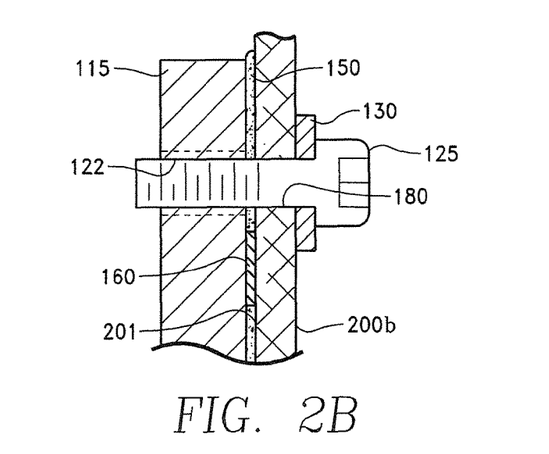
FIG. 2B is an assembled, elevational view of one embodiment of the non-cylindrical composite tubing taken substantially along circular line 2B of FIG. 2A.
Figure 14:
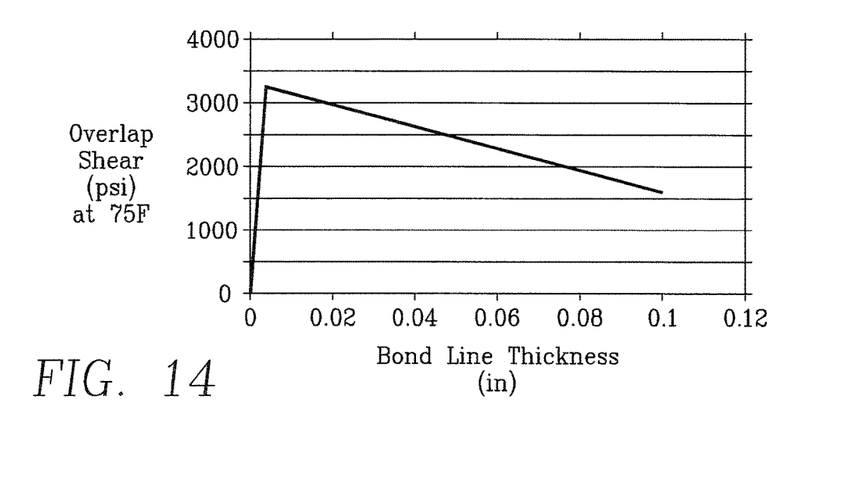
FIG. 14 is a graph depicting the relationship of shear strength versus bond line thickness for the epoxy adhesive used for the bonding plates, according to some embodiments of the present disclosure.

FIG. 2B is an assembled, elevational view of one embodiment of the non-cylindrical composite tubing taken substantially along circular line 2B of FIG. 2A. As shown in FIG. 2B, one embodiment of the composite tubing 200 may comprise: bonding plate 115, bonding plate fastener 125, washer 130, shim 160, and epoxy adhesive 150. Importantly, FIG. 2B shows that an exemplary embodiment of the composite tubing 200 may have an epoxy adhesive 150 with a bond line having a predetermined thickness. In one embodiment, the predetermined thickness may be approximately 0.010 inches. In order to maintain this thickness, embodiments of the shims 160 should likewise have a thickness of approximately 0.010 inches. Although the bond line thickness of the epoxy adhesive 150 may be approximately 0.010 inches, various embodiments of the epoxy adhesive may be less or greater than 0.010 inches. FIG. 14, for example, shows varying bond line thicknesses for the epoxy adhesive for different embodiments.

Figure 3A:
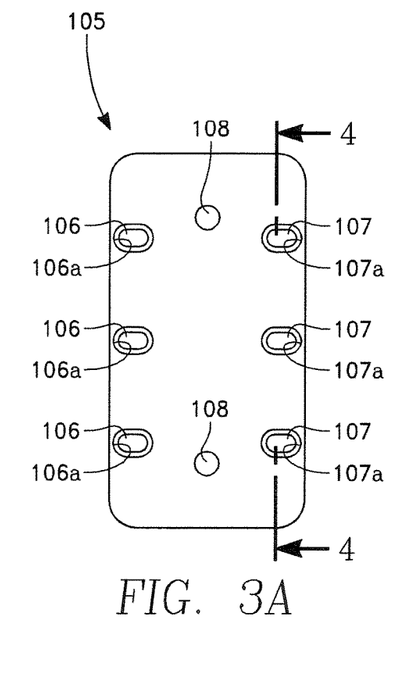
FIGS. 3A and 3B are front elevational and perspective views, respectively, of the end plate, according to some embodiments of the present disclosure.
Figure 3B:
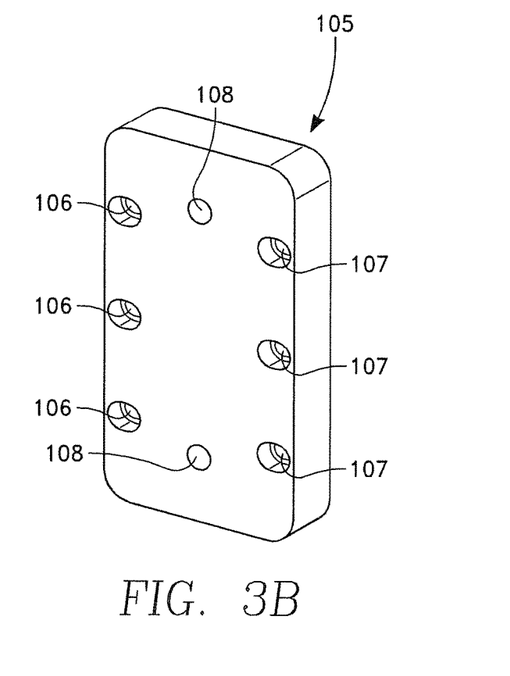

FIGS. 3A and 3B are front elevational and perspective views of the end plate, according to some embodiments of the present disclosure. As discussed above, the end plate 105 may be a flattened piece formed for terminating the open end 101 portion of the composite tubing 200. The end plate 105 may also be of unitary construction and be made of a metal such as aluminum. As discussed above, one embodiment of the end plate 105 may be 7075 aluminum alloy due to its high strength and decent machinability characteristics.

The end plate 105 may also have an outer cross sectional shape that matches the outer cross sectional shape of the composite tubing 200. In one embodiment, as shown in FIGS. 3A and 3B, the end plate 105 may be dimensioned to have an outer cross sectional shape that is substantially rectangular with rounded or filleted corners, similar to the cross-sectional shape of the composite tubing 200. In this manner, the end plate 105 may serve as a termination for the open end 101 of the composite tubing 200. For example, embodiments of both the end plate 105 and composite tubing 200 may have corners with radii of approximately 0.354 inches. In some embodiments, the length of the end plate 105 may be between approximately 3.5 to 5.5 inches.

Importantly, in accordance with the further teachings of the present disclosure, the end plate 105 may comprise first slotted holes 106, second slotted holes 107, and attachment points 108. The first slotted holes 106 and second slotted holes 107 are preferably elongated holes with round or square ends that traverse laterally along the width of the end plate 105. This will preferably allow the bonding plates 110, 115 to move laterally along the width of the end plate 105.

In some embodiments, each of the first slotted holes 106 and second slotted holes 107 may traverse laterally between approximately 0.1 to 0.5 inches. In other embodiments, the first slotted holes 106 and second slotted holes 107 may be shorter or longer. The first slotted holes 106 and second slotted holes 107 may also have a radius of at least the same as (or slightly larger than) the radius of the shank portion of the end plate fasteners 120. In various embodiments, the first slotted holes 106 and second slotted holes 107 may be reamed, drilled, or milled completely through the thickness of the end plate 105 and are preferably disposed in parallel with respect to each other. In an exemplary embodiment, the first slotted holes 106 and second slotted holes 107 may be slotted bolt holes.

In some exemplary embodiments, the first slotted holes 106 and second slotted holes 107 may be arranged in multiple groups. Specifically, the first slotted holes 106 may be arranged in a column along a vertical axis near one side of the end plate 105, such that the corresponding second slotted holes 107 in the adjacent column are offset from the first slotted holes 106 at the other side of the end plate 105. For example, in an exemplary embodiment and as shown in FIGS. 3A and 3B, the end plate 105 may comprise three first slotted holes 106 and three second slotted holes 107, all being arranged in parallel with each other. Although six slotted holes are shown, any number could be used depending on the arrangement and geometry the end plate 105.

FIGS. 3A and 3B also show that the first slotted holes 106 and second slotted holes 107 may have counterbores 106a, 107a, which may be shaped to snugly receive the outer perimeter of the head portion of the end plate fasteners 120. In this manner, after insertion of the end plate fasteners 120 through the first slotted holes 106 and second slotted holes 107, the distal face of the end plate 105 may sit flush against another surface without obstruction or interference by the head portion of the end plate fasteners 120.

FIGS. 3A and 3B also show that the end plate 105 may comprise attachment points 108. The attachment points 108 may be configured for coupling or engaging the end portion of the composite tubing 200 to another surface. For example, in one embodiment, the attachment points 108 may allow the composite tubing 200 to couple or attach to a second connector 100 of another composite tubing 200. In multiple embodiments, the attachment points 108 may be threaded through-holes that matingly engage with threaded fasteners such as threaded bolt fasteners.

Figure 4:
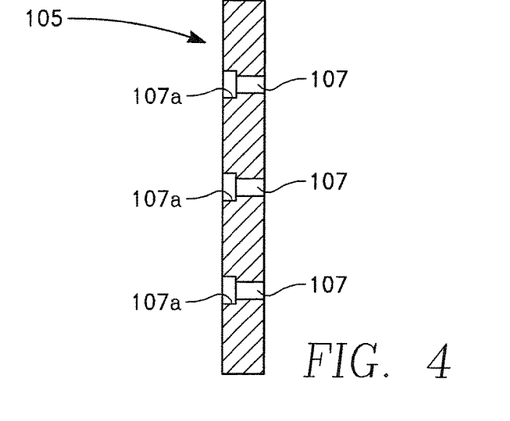
FIG. 4 is a cross-section view of the end plate of FIGS. 3A and 3B, showing cut plane 4-4 (section 4-4 is depicted in FIG. 4), according to some embodiments of the present disclosure.

FIG. 4 is a side view of the end plate of FIGS. 3A and 3B, showing cut plane 4-4 (section 4-4 is depicted in FIG. 4), according to some embodiments of the present disclosure. As shown in FIG. 4, one embodiment of the end plate 105 may comprise second slotted holes 107 arranged in a column along a vertical axis. FIG. 4 also shows that each second slotted hole 107 may have a hole traversing longitudinally through the thickness of the end plate 105. Importantly, FIG. 4 shows that each second slotted holes 107 may have a counterbore 107a for snugly fitting the head portion of each end plate fastener 120 below the outer surface of the end plate 105.

Figure 5A:
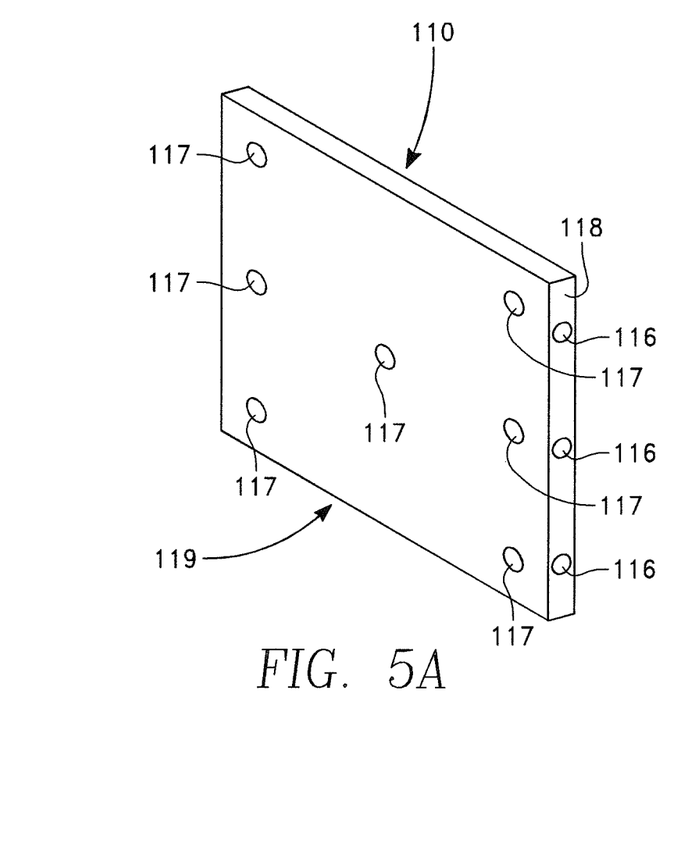
FIGS. 5A and 5B are perspective views of the bonding plates, according to some embodiments of the present disclosure.
Figure 5B:
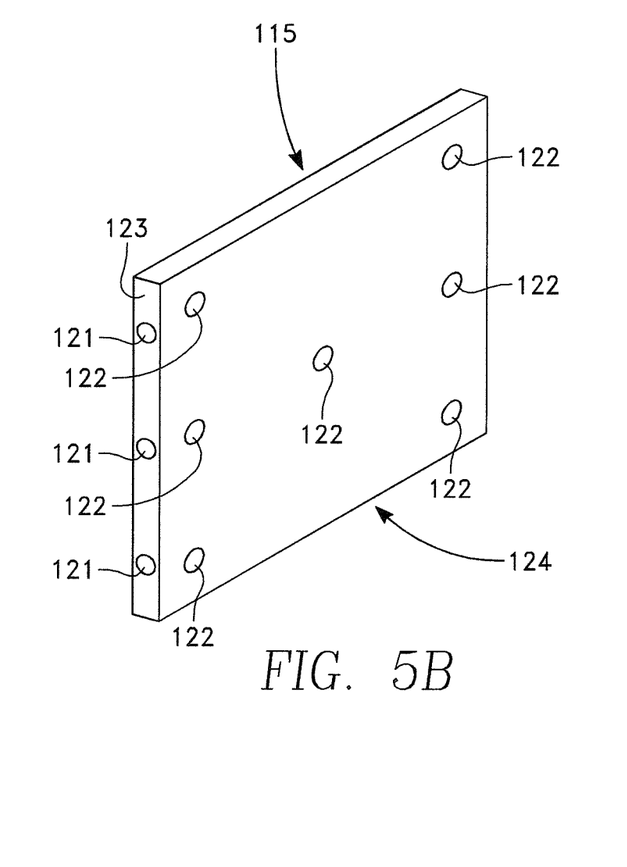

FIGS. 5A and 5B are perspective views of the bonding plates, according to some embodiments of the present disclosure. As discussed above, the bonding plates 110, 115 may be used for coupling the end plate 105 to the composite tubing 200 and may be constructed of a metal such as aluminum (e.g., 7075 aluminum). Each bonding plate 110, 115 may also be adapted to fit within the open end 101 of the composite tubing 200, such that each bonding plate 110, 115 may attach and adhere to an inner surface 201 or wall of the composite tubing 200. In particular, the first bonding plate 110 and the second bonding plate 115 may adhere to the inner surface 201 of the two lateral sides 200a, 200b of the composite tubing 200 via a bonding or epoxy adhesive 150, which is preferably uniformly distributed. In some embodiments, the length and height of each bonding plate 110, 115 may range from 2 to 6 inches.

Importantly, each of the bonding plates 110, 115 may have two groups of multiple threaded holes. Specifically, first threaded holes 116, 121 may be disposed along a distal lateral face 118, 123 of the bonding plates 110, 115, whereas the second threaded holes 117, 122 may be arranged on the outer faces 119, 124 of the bonding plates 110, 115. Preferably, the first threaded holes 116, 121 are arranged in a column along a vertical axis, such that each first threaded hole 116, 121 is aligned with a corresponding slotted hole (i.e., first slotted hole 106, second slotted hole 107) on the end plate 105. Specifically, in an exemplary embodiment for the end plate 105 shown in FIGS. 3A and 3B, the bonding plates 110, 115 may each comprise first threaded holes 116, 121 adapted to align with a corresponding first slotted hole 106 or second slotted hole 107. As a result, the first threaded holes 116, 121 are preferably accessible when the bonding plates 110, 115 are disposed within the open end 101 of the composite tubing 200.

Regarding the second threaded holes 117, 122 these holes are preferably located on the outer faces 119, 124 of the bonding plates 110, 115. In this manner, when inserted within the open end 101 of the composite tubing 200, the bonding plates 110, 115 may be adjacent to the lateral sides 200a, 200b of the composite tubing 200. As a result, the second threaded holes 117, 122 may be aligned with the through-holes 180 of the composite tubing 200, thereby allowing the bonding plate fasteners 125 to be inserted through the through-holes 180 and engage with the second threaded holes 117, 122 of the bonding plates 110, 115. Once the bonding plate fasteners 125 are inserted through the through-holes 180 of the composite tubing 200 and engaged with the second threaded holes 117, 122 of the bonding plates 110, 115, tightening of the bonding plate fasteners 125 may move or shift the bonding plates 110, 115 outwardly, thereby causing the connector 100 to be disposed in an outward configuration. In this manner, the epoxy adhesive 150 applied on the outer faces 119, 124 of the bonding plates 110, 115 may be uniformly distributed onto the inner surface 201 of the composite tubing 200, such that the bonding plates 110, 115 may also bond or adhere to the inner surface 201 of the composite tubing 200. In multiple embodiments, washers 130 may engage with the bonding plate fasteners 125 and be placed under the head portion of the bonding plate fasteners 125 to help distribute the pressure or load when the bonding plate fasteners 125 are tightened.

Figure 6:
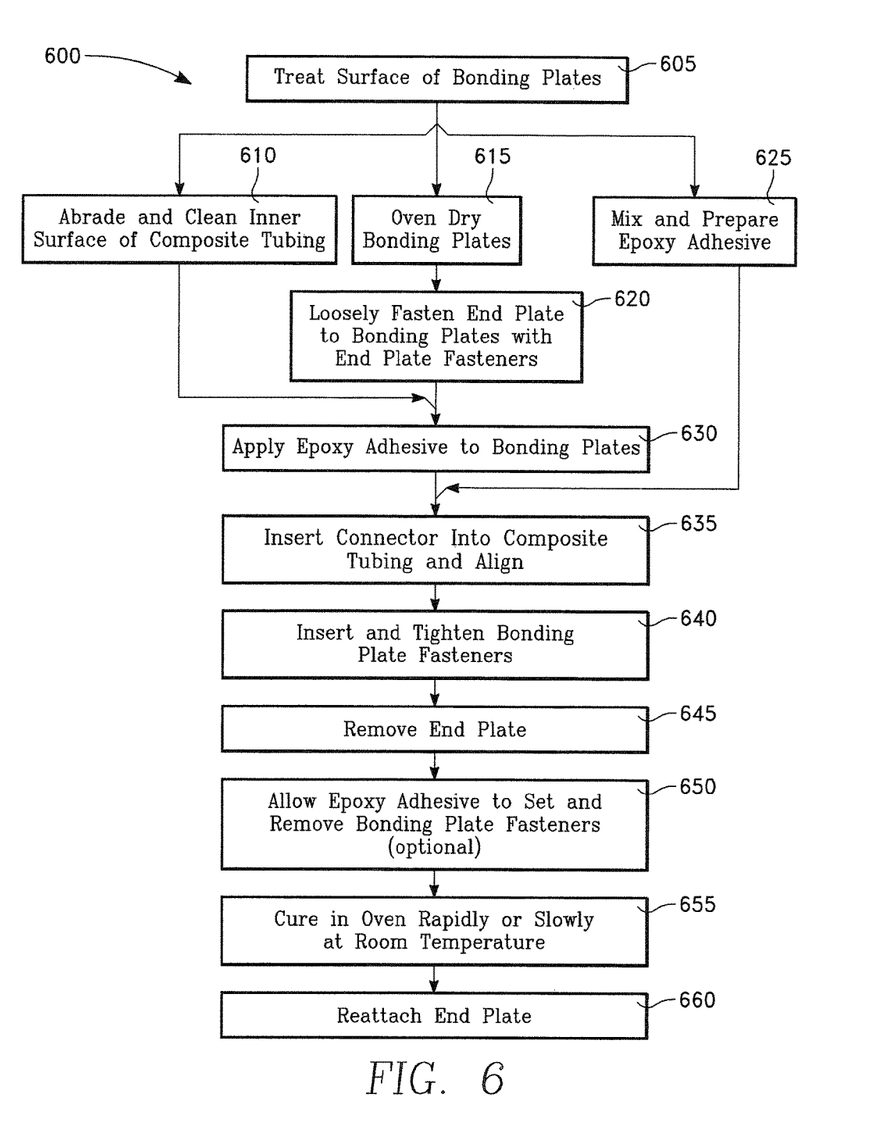
FIG. 6 is a flow chart of a method of assembling and installing a connector to a non-cylindrical composite tubing, according to some embodiments of the present disclosure.
Figures 7A, 7B:
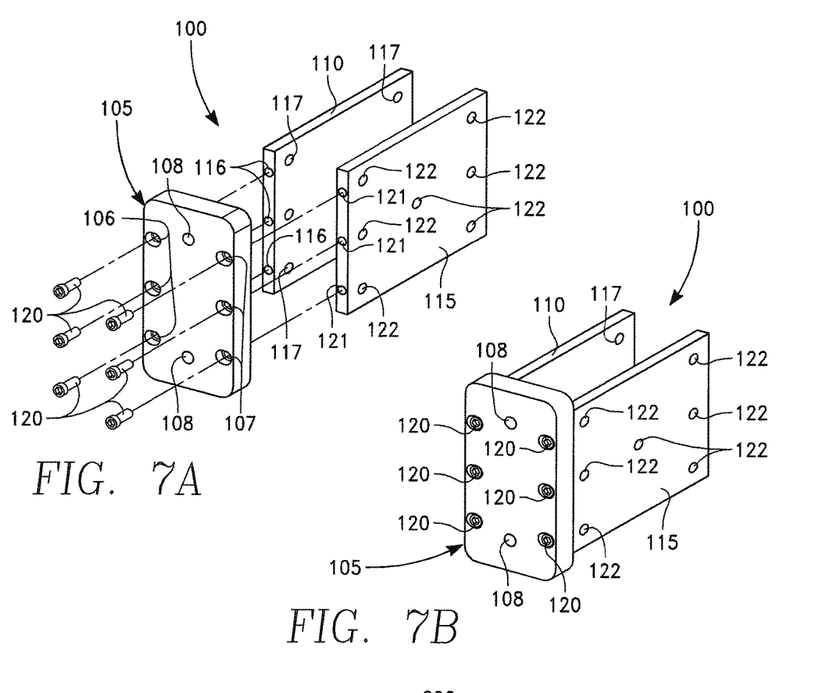
FIGS. 7A and 7B are exploded and assembled views of the connector, according to some embodiments of the present disclosure.
Figure 8:
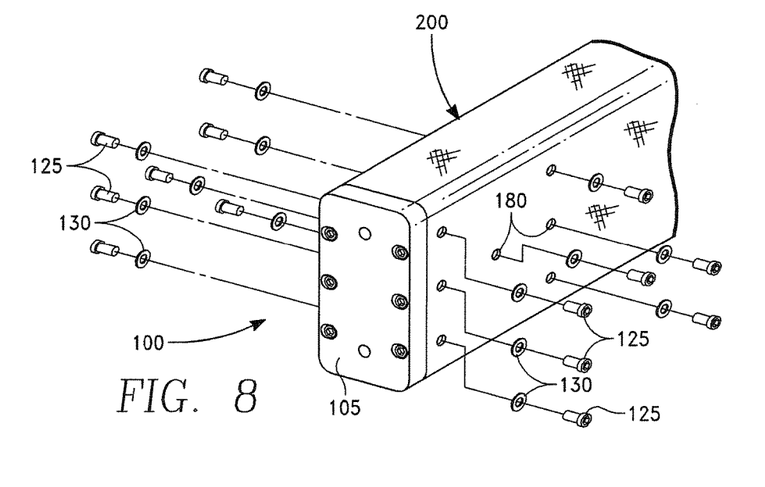
FIG. 8 is a perspective view of the connector and composite tubing and shows the bonding plates of the connector inserted into the open end of the non-cylindrical composite tubing prior to installation of the bonding plate fasteners, according to some embodiments of the present disclosure.
Figure 9:
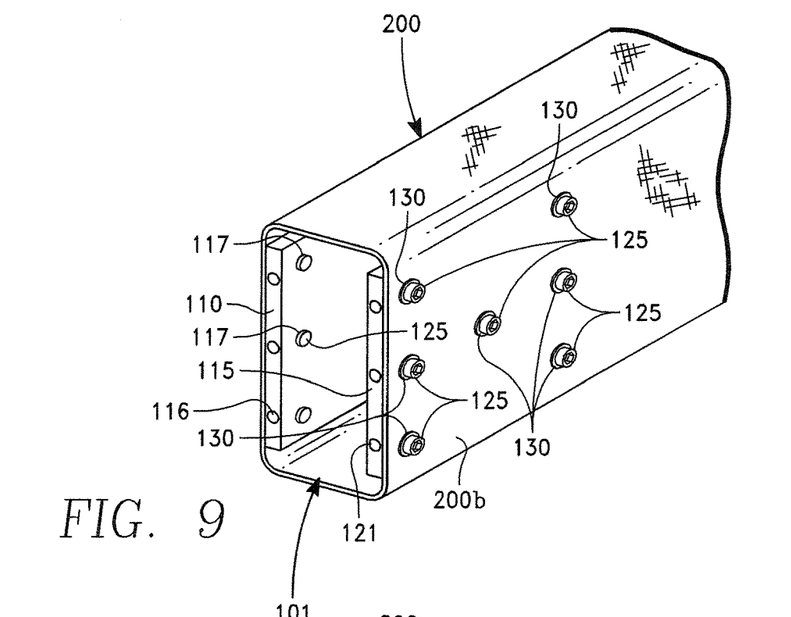
FIG. 9 is a perspective view of the connector and composite tubing without the end plate and end plate fasteners, according to some embodiments of the present disclosure.
Figure 10:
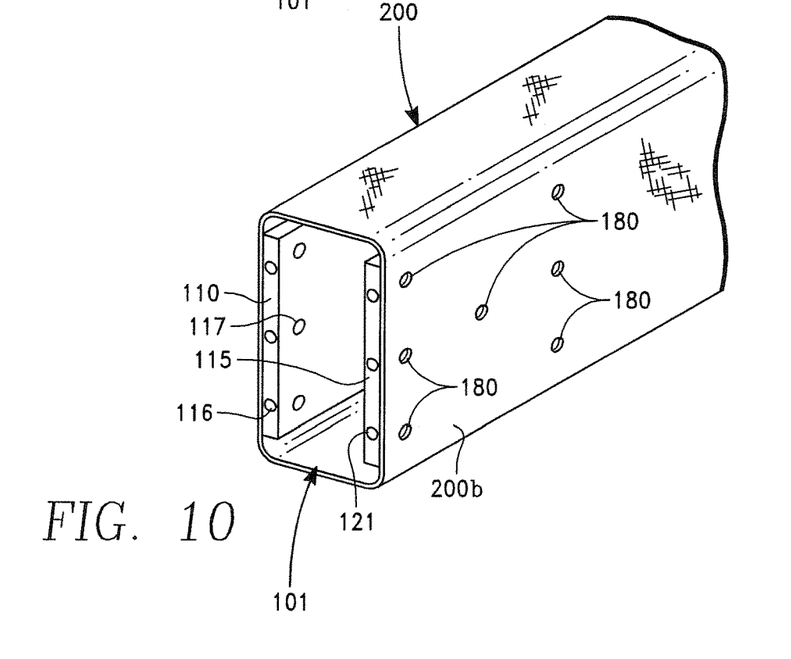
FIG. 10 is a perspective view of the connector and composite tubing without the end plate, end plate fasteners, and bonding plate fasteners, according to some embodiments of the present disclosure.
Figure 11:
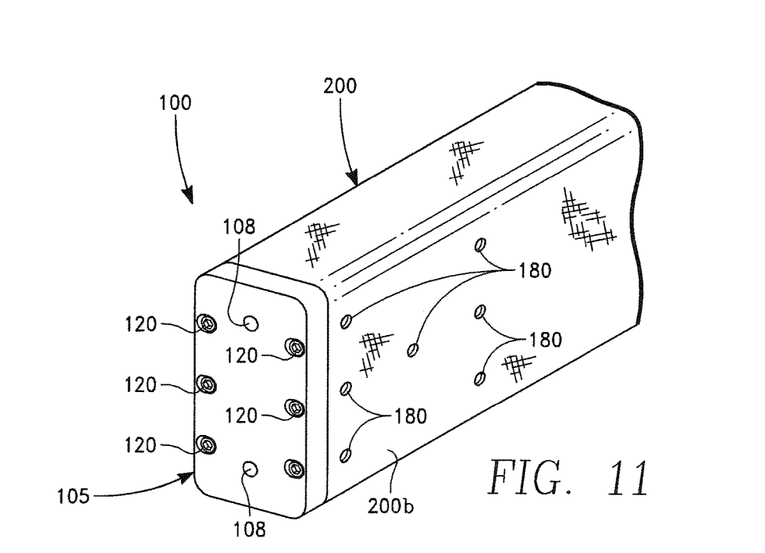
FIG. 11 is a perspective view of the connector and composite tubing without the bonding plate fasteners, according to some embodiments of the present disclosure.

FIG. 6 is a flow chart of a method of creating a connector for a non-cylindrical composite tubing, according to some embodiments of the present disclosure. As shown in FIG. 6, one embodiment of the method 600 may comprise steps: 605, 610, 615, 620, 625, 630, 635, 640, 645, 650, 655, 660. To further illustrate the method 600, FIGS. 7A to 11 also depict in the detail various steps of the method 600. Specifically, FIGS. 7A and 7B are exploded and assembled views, respectively, of one embodiment of the connector 100 and show how the connector 100 is assembled in step 620 of the method 600. FIG. 8 is a perspective view of the connector 100 and composite tubing 200, according to some embodiments, and shows the bonding plates 110, 115 of the connector 100 inserted into the open end 101 of the non-cylindrical composite tubing 200 prior to installation of the bonding plate fasteners 125 in step 635 of the method 600. FIG. 9 is a perspective view of the connector 100 and composite tubing 200 without the end plate 105 and end plate fasteners 120, as shown in step 645 of the method 600. FIG. 10 is a perspective view of the connector 100 and composite tubing 200 without the end plate 105, end plate fasteners 120, and bonding plate fasteners 125, as depicted in step 650 of the method 600. FIG. 11 is a perspective view of the connector 100 and composite tubing 200, according to some embodiments, and shows end plate 105 installed to the connector 100 without the bonding plate fasteners 125 as depicted in step 660 of the method 600.

FIG. 6 shows that one embodiment of the method 600 may comprise the first step 605 of treating the surface of the bonding plates 110, 115 via chemical etching. Here, subjecting the bonding plates 110, 115 to chemical etching may produce a more unifoini, leveled surface and may smooth out surface imperfections, thereby producing a more uniform appearance. The surface of the bonding plates 110, 115, for example, may be chemically treated with an acid solution in order to remove oxidation and contaminants from the surfaces, so as to increase the adhesion of the epoxy adhesive 150 on the bonding plate 110, 115 surfaces. In one embodiment, the bonding plates 110, 115 may be chemically etched by the ASTM standard method described in ASTM E864-12.

In various embodiments, the bonding plate surfaces may also be first treated by using a cleaning solvent to wipe the metal surface and then treating the cleaned surface with a mechanical abrasion, abrasive blast, or chemical etching to achieve a water break-free surface. For example, in one embodiment, the surfaces of the bonding plates 110, 115 may be first cleaned with acetone and cotton rags and then abraded with a sander using an 80 grit ceramic blend sandpaper. The bonding plates 110, 115 may then be recleaned with acetone and then degreased and rinsed using deionized water, acetone, and/or methanol. Thereafter, the bonding plates 110, 115 may be dried, which may be carried out in an oven, as shown in step 615. In one embodiment, the bonding plates 110, 115 may be oven dried at about 60° C. (140° F.) for a period of about 35 minutes.

FIG. 6 also shows that the method 600 may comprise step 610, which may be abrading and cleaning the inner surface 201 of the composite tubing 200. Here, like the bonding plates 110, 115, the inner composite surface may first be treated by first using a cleaning solvent, such as acetone or another suitable solvent to wipe the composite surface. The inner surface 201 of the composite tubing 200 may then be sanded with 150 or 180 grit aluminum oxide abrasive paper or another suitable sanding element and then abraded with a pneumatic sander. The abraded surfaces of the composite tubing 200 may then be cleaned with a solvent such as acetone.

Figure 12:
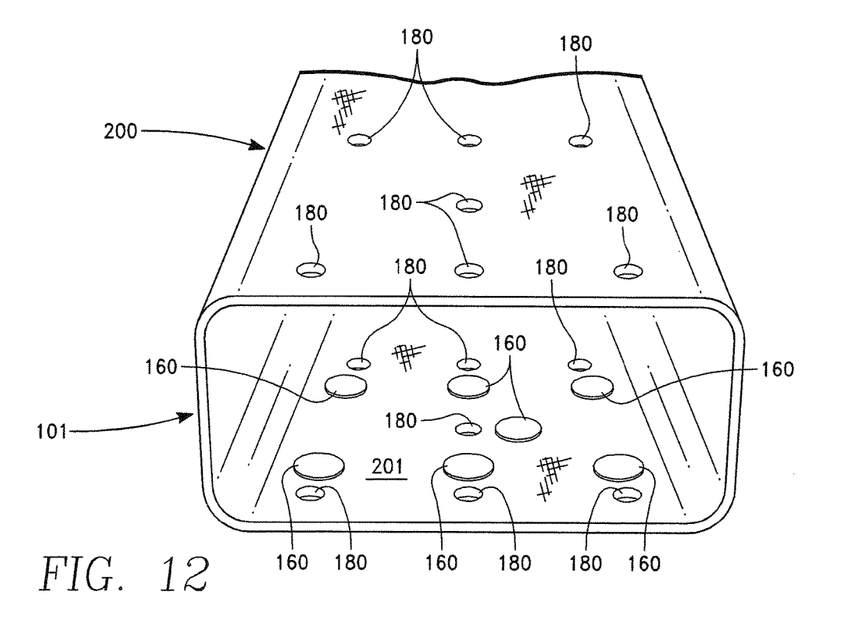
FIG. 12 is a perspective view of the open end of the composite tubing and shows shims on the inner surface of the composite tubing, according to some embodiments of the present disclosure.

Optionally, in one embodiment, shims 160 may be installed to the composite tubing 200. In particular, shims 160 may be coupled to the inner surface 201 of the composite tubing 200 and adjacent to the through-holes 180. This may allow the shims to be disposed between the bonding plates 110, 115 and the composite tubing 200. In this manner, the epoxy adhesive 150 may have a predetermined thickness based on the thickness of the shims 160 when adhering the bonding plates 110, 115 to the inner surface 201 of the composite tubing 200. FIG. 12 depicts one embodiment of the shims 160 used for the connector 100 and method 600.

Turning to steps 620, 630, one embodiment of the connector 100 may be assembled and bonded. Here, the bonding plates 110, 115 may be loosely coupled to the end plate 105 via the end plate fasteners 120. Specifically, in step 620, the end plate fasteners 120 may be first inserted through the first slotted holes 106 and second slotted holes 107 of the end plate 105 and then engaged with the first threaded holes 116, 121, which are preferably disposed along a distal lateral face 118, 123 of the bonding plates 110, 115. In this manner, the bonding plates 110, 115 may move sideways along the first slotted holes 106 and second slotted holes 107. Thus, the bonding plates 110, 115 may move together from a first position to a second position upon application of an external force against the outer faces 119, 124 of the bonding plates 110, 115. The bonding plates 110, 115, in some embodiments, may be actuated by hand from a first (outward) position to a second (inward) position, allowing insertion of the bonding plates 110, 115 into the open end 101 of the composite tubing 200. Thus, the bonding plates 110, 115 may be repositioned inwardly in an inward configuration and outwardly in an outward configuration. A person having ordinary skill in the art will recognize that the dimensions of the first slotted holes 106 and second slotted holes 107 may be varied to accommodate different sizes of the composite tubing 200 without detracting from the merits or generality of embodiments.

After the connector 100 is disposed into an inward configuration (i.e., the bonding plates 110, 115 are moved inwardly), the epoxy adhesive 150 may be applied to the outer faces 119, 124 of the bonding plates 110, 115, as shown in step 630. The epoxy adhesive 150 may also be prepared in step 625. For example, one embodiment of the epoxy adhesive 150 may be 3M® Scotch-Weld™ Epoxy Adhesive, and more specifically, model 2216 B/A, which is generally a two-part, epoxy adhesive that provides a flexible impact-resistant overlap bond with high shear strength. Overlap shear strength generally ranges between approximately 900 to 1600 psi, depending on the operating temperature, film type, and substrate. The Scotch-Weld™ 2216 B/A may also exhibit high resistance to environmental conditions such as humidity as well as resistance to industrial solvents, lubricating oils, and fuels.

Here, in one embodiment of the method 600 in step 625, 46 grams of epoxy adhesive 150 may be prepared from 3M® Scotch-Weld™ Epoxy 2216 B/A by mixing 26 grams of Part A and 18.57 grams Part B. Once prepared, the epoxy adhesive 150 may be applied to the outer faces 119, 124 of the bonding plates 110, 115, as shown in step 630. It should be appreciated that the Scotch-Weld™ 2216 B/A is exemplary, and other bonding adhesives may be considered within the scope of the present disclosure.

Referring to step 635 of the method 600, when the connector 100 is disposed in an inward configuration, the connector 100 is preferably aligned and inserted into the open end 101 of the composite tubing 200. Here, the bonding plates 110, 115 are inwardly disposed in order to minimize contact between the outer faces 119, 124 of the bonding plates 110, 115 and the inner surface 201 of the composite tubing 200. This in turn preferably prevents scraping of the epoxy adhesive 150 and allows uniform bonding of the epoxy adhesive 150.

Once inserted into the open end 101 of the composite tubing 200, the bonding plates 110, 115 are preferably adjacent to the lateral sides 200a, 200b of the composite tubing 105. As discussed above, the second threaded holes 117 are preferably aligned with the through-holes 180 of the composite tubing 200. In this manner, step 640 may be performed by inserting the bonding plate fasteners 125 into the through-holes 180 of the composite tubing 200 and engaging the bonding plate fasteners 125 with the second threaded holes 117, 122 of the bonding plates 110, 115. The bonding plate fasteners 125 may then be fastened and tightened thereafter, causing the bonding plates 110, 115 to shift or move outwardly. As a result, the connector 100 may then be in an outward configuration. Preferably, the bonding plate fasteners 125 are fastened and tightened in a sequence using a torque pattern to allow the bonding plates 110, 115 to shift or move outwardly. This may uniformly distribute the epoxy adhesive on the inner surface 201 of the composite tubing 200 without scraping. As discussed above, shims 160 may also be used to help maintain a predetermined thickness of the epoxy adhesive 150.

After the bonding plate fasteners 125 are installed and tightened in step 640, the end plate 105 may be removed optionally by uninstalling the end plate fasteners 120, as shown in step 645. This will allow a user to observe the end plate 105 and end plate fasteners 120 to ensure that the end plate 105 and end plate fasteners 120 are not bonded to the bonding plates 110, 115 and/or composite tubing 200. Also, by removing the end plate 105, a user may inspect the bond line of the epoxy adhesive and surrounding area, so that any residual epoxy may be cleaned.

Referring to step 650 of the method 600, the epoxy adhesive 150 may be set for drying. In one embodiment, the epoxy adhesive 150 may be set to dry for approximately 24 hours. During this time, the user, if desired, may optionally remove the bonding plate fasteners 125 to prevent the bonding plate fasteners 125 from permanently adhering to the bonding plates 110, 115 and/or composite tubing 200. The epoxy adhesive 150 may also dry in step 655 by either curing at ambient temperature for an extended period of time or accelerating the curing time in an oven. Once cured, the end plate 105 may be reattached to complete the assembly of the connector 100, as shown in step 660.

FIG. 12 is a perspective view of the open end of the composite tubing and shows shims installed onto the inner surface of the composite tubing, according to some embodiments of the present disclosure. As shown in FIG. 12, one embodiment of the composite tubing 200 may comprise shims 160, which are preferably attached to the inner surface 201 of the composite tubing 200. As discussed above, the thickness of the shims 160 may be used to maintain a predetermined thickness of the bond line of the epoxy adhesive 150 when the bonding plates 110, 115 are installed.

Figure 13:
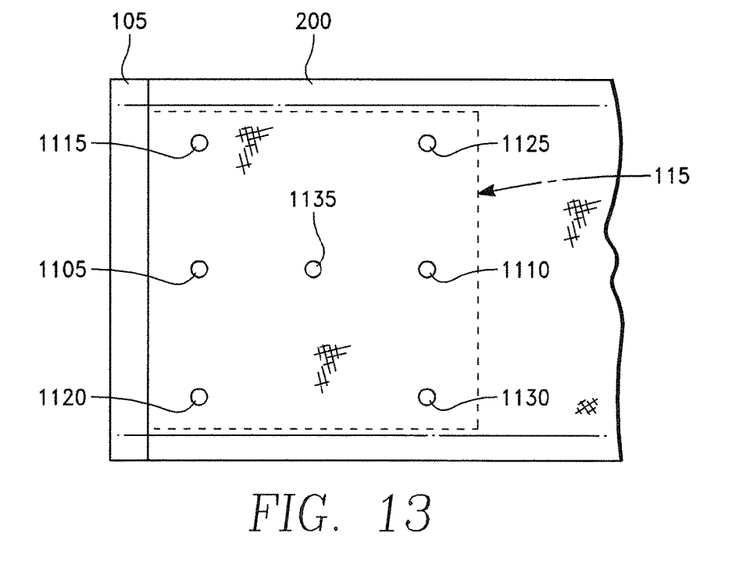
FIG. 13 is a side view of a portion of one embodiment of the composite tubing depicting through-holes and shows an installation sequence of the bonding plate fasteners using a predetermined torque pattern or bolt tightening sequence.

FIG. 13 is a side view of a portion of one embodiment of the composite tubing depicting through-holes and shows an installation sequence of the bonding plate fasteners using a predetermined torque pattern. As shown in FIG. 13, another embodiment of the composite tubing 300 may comprise: through-holes 1105, 1110, 1115, 1120, 1125, 1130, 1135. FIG. 13 also shows that some of the through-holes may be diametrically-opposed to one another. For example, in one embodiment, through-hole 1115 may be diametrically-opposed to through-hole 1130; through-hole 1125 may be diametrically-opposed to through-hole 1120; and through-hole 1105 may be diametrically-opposed to through-hole 1110. In multiple embodiments, the bonding plate fasteners 125 may be bolt fasteners configured to be tightened to approximately 10 in-lbs.

Importantly, FIG. 13 also shows one embodiment of an installation sequence for the bonding plate fasteners 125. Specifically, one embodiment of the installation sequence may begin by tightening the bonding plate fasteners 125 located at through holes 1105, 1110, both of which are located along a centerline of the composite tubing 200 and adjacent to center through-hole 1115. In this manner, tightening the bonding plate fasteners 125 for through holes 1105, 1110 may cause the bonding plates 110, 115 to move and become flushed against the inner surface of the composite tubing 200. After the bonding plate fasteners 125 for through holes 1105, 1110 have been fastened and tightened, the bonding plate fasteners 125 situated at the corner through-holes 1115, 1120, 1125, 1130 are preferably tightened. It is important to note that some of these corner through-holes 1115, 1120, 1125, 1130 may be diametrically-opposed to one another. In one embodiment, the bonding plate fasteners 125 for the corner through holes 1115, 1120, 1125, 1130 may be tightened in a crisscross pattern, but may be tightened in any order in other embodiments. After the bonding plate fasteners 125 for the corner through-holes 1115, 1120, 1125, 1130 are tightened, the bonding plate fastener 125 for the center through-hole 1135 is preferably tightened when completing the installation sequence.

The installation sequence of the bonding plate fasteners 125 is advantageous for two reasons. First, the installation sequence may ensure that the lateral sides 200a, 200b of the composite tubing 200 are flat against the bonding plates 125. This may mend areas where the composite tubing 200 has premanufactured bends or bowed areas. Thus, by tightening the bonding plate fasteners 125 in a certain sequence, the bended and bowed areas of the composite tubing 200 may be flattened or straightened.

Second, the installation sequence may also prevent or reduce air bubble formation. By installing and tightening the bonding plate fasteners 125 in a certain sequence, the bonding plate fasteners 125 may uniformly contact the inner surface 201 of the composite tubing 200, resulting with uniform distribution of the epoxy adhesive 150 and thus minimizing any air bubbles that may be present in the epoxy adhesive 150.

FIG. 14 is a graph depicting the relationship of shear strength versus bond line thickness for the epoxy adhesive 150 used for the bonding plates, according to some embodiments of the present disclosure. Here, the graph is generally directed to a 2216B/A epoxy adhesive 150 created by 3M® and shows the relationship of between bond line thickness and shear strength at 75° F. Various embodiments of the epoxy adhesive 150, however, may reflect similar characteristics such as DP-420, which is also manufactured by 3M®.

As depicted in FIG. 14, as the thickness of the bond line increases, the overlap shear strength generally declines. For example, when the thickness of the bond line is less than 0.020 inches, the shear strength generally does not decrease below 3000 psi. On the other hand, when the thickness of the bond line increases above 0.035 inches, the shear strength generally decreases between 2500 to 3000 psi. Any thickness more than 0.060 inches, will likely result with a shear strength below 2500 psi, and possibly lower than 2000 psi.

FIG. 14 also depicts the behavior of shear strength as the bond line thickness reaches zero inches. Here, when the bond line thickness decreases from 0.003 inches to zero, the shear strength also generally rapidly declines. When the bond line thickness is zero, the shear strength of the epoxy adhesive 150 becomes 0 psi.

In one embodiment, the epoxy adhesive 150 may be 2216B/A by 3M® due to its semi-rigidness and high shock characteristics. The 2216B/A is also generally capable of maintaining high strengths in high temperatures, which is important for large impulse loadings for the UAV launcher. Given that shear strength of an epoxy adhesive 150 generally degrades when temperature increases, the 2216B/A may be capable of maintaining high shear strengths at high temperatures.

FIG. 14 shows that the 2216B/A epoxy adhesive generally reaches its maximum shear strength when the bond line thickness is between approximately 0.003 to 0.005 inches. The peel strength of 2216B/A is also generally achieved when the thickness of the bond line is between approximately 0.017 to 0.025 inches.

In an exemplary embodiment, the bond line is preferably approximately 0.010 inches thick due to its relatively high shear strength and low margin of shear strength variability. Otherwise, a thinner bond line may adversely affect shear strength. Having a bond line thickness less than 0.010 inches, for example, may result with air bubble formation and a non-uniform distribution of the epoxy adhesive 150, both of which may adversely affect shear strength as certain areas of the composite tubing 200. Because areas of the composite tubing 200 may not be entirely flat and non-uniform, a thin bond line (e.g., less than 0.003 inches) may severely degrade shear strength. Thus, having a bond line thickness of at least 0.010 inches may allow a margin for variability without causing the thickness to dip below 0.003 inches.

Figure 15:
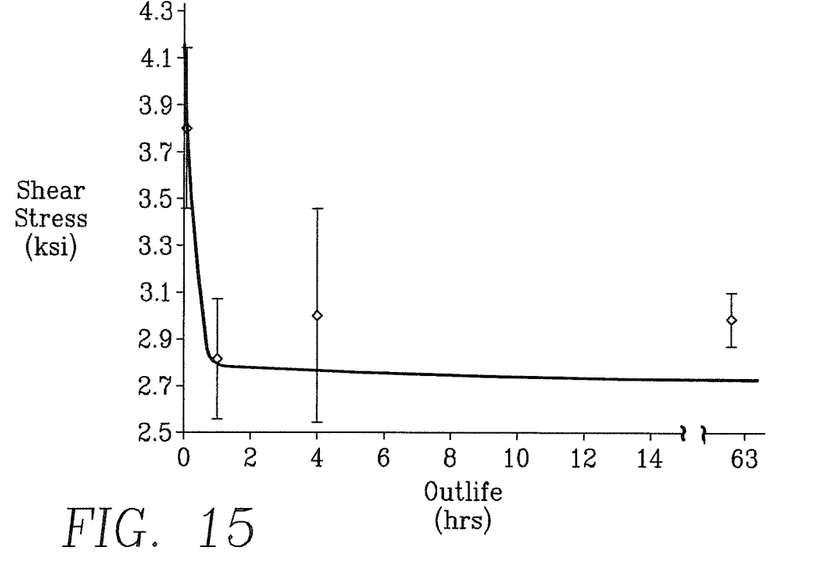
FIG. 15 is a graph depicting the relationship of shear strength versus outlife time for the epoxy adhesive after oven drying, according to some embodiments of the present disclosure.

FIG. 15 is a graph depicting the relationship of shear strength versus outlife time after oven drying, according to some embodiments of the present disclosure. Here, FIG. 15 shows the initial bond strength and outlife effect of a 7075 aluminum alloy. The bonding plates 110, 115 are preferably heated and oven dried up to approximately 140° F. after the etching process. There is generally, however, a very short time period for the bonding to occur (i.e., usually less than an hour). Otherwise, the bond strength may degrade asymptotically after this time period in an exponential manner. For example, after etching of the 7075 aluminum alloy, the bond strength of the 7075 aluminum alloy dramatically decreases during the first hour of outlife time. Here, the initial bond strength at zero hours appeared to be significantly stronger at 3.74 ksi, but after the first hour, the bond strength drops significantly at about 20.2%.

Load Testing of the Apparatus

Significant material and load testing has been completed to show functionality of the connector 100 for the composite tubing 200. The load testing involved used a compression tester such as the Instron® 5884 and 2525-181 having a 33,000 pound load cell. Composite tubings 200 having a connector 100 installed and bonded were inserted into the Instron® device at room temperature in order to exert forces thereon. The Instron® device raised and lowered the load cell onto the connectors 100 of three composite tubings 200 at max loads of 29,549, 29,580, and 28,669 lbf. As a result, physical failures occurred consistently for each composite tubing 200, but not on the connectors 100. In particular, all three composite tubings 200 experienced audible cracking at about 0.5 seconds before failure, and the failures were loud and abrupt without lateral motion to the Instron® device. Importantly, the bonded connectors 100 did not fail and did not experience any visible signs of damage.

While the embodiments have been described, disclosed, illustrated and shown in various modifications which it has presumed in practice, the scope of protection is not intended to be, nor should it be deemed to be, limited thereby and such other modifications or embodiments as may be suggested by the teachings herein are particularly reserved especially as they fall within the breadth and scope of the claims here appended.

What is claimed as new and desired to be protected by Letters Patent is set forth in the appended claims:

1. A method of assembling and installing a connector to a pre-manufactured, non-cylindrical composite tubing, comprising:
   providing first and second bonding plates, each having a distal lateral face defining a plurality of first threaded holes and an outer face having a plurality of second threaded holes;
   providing a composite tubing being non-cylindrical and extending lengthwise about a central axis, said composite tubing having at least two lateral sides disposed in parallel in a transverse direction relative to said lengthwise direction and an open end defining a hollow interior portion shaped to completely contain said first and second bonding plates, wherein said composite tubing comprises a plurality of through-holes configured to align with said plurality of second threaded holes of said first and second bonding plates;
   providing an end plate having an outer cross sectional shape matching an outer cross sectional shape of said open end of said composite tubing and a plurality of first and second slotted holes disposed substantially in parallel with respect to each other and each aligned with an associating one of said first threaded holes, wherein said end plate comprises one or more attachment points;
   movably fastening said first and second bonding plates to said end plate to create a connector by inserting said end plate fasteners through said first and second slotted holes and engaging said end plate fasteners with said plurality of first threaded holes, such that said first and second bonding plates are oriented orthogonally to said end plate and are disposed substantially in parallel with each other, wherein said outer faces of said first and second bonding plates are facing away each other;
   moving said first and second bonding plates of said connector inwardly along said first and second slotted holes of said end plate, such that said connector is in an inward configuration;
   applying an epoxy adhesive on said outer faces of said first and second bonding plates;
   aligning said first and second bonding plates to fit inside said open end of said composite tubing;
   inserting said first and second bonding plates of said connector into said open end of said composite tubing without having said epoxy adhesive contact said inner surface of said composite tubing, such that said outer faces of said first and second bonding plates are adjacent to said inner surface of said at least two lateral sides of said composite tubing;
   inserting a plurality of bonding plate fasteners through said plurality of through-holes and engaging said plurality of bonding plate fasteners with said plurality of second threaded holes; and
   adhering said first and second bonding plates against said inner surface of said composite tubing by fastening said plurality of bonding plate fasteners using a predetermined torque pattern, such that said epoxy adhesive is uniformly distributed.

2. The method as recited in claim 1, further comprising the step of:
   installing a plurality of shims to said inner surface of said composite tubing: between said first bonding plate and said inner surface of said composite tubing and between said second bonding plate and said inner surface of said composite tubing;
   wherein said plurality of shims each have a predetermined thickness.

3. The method as recited in claim 2, characterized in that said predetermined thickness of said plurality of shims is approximately 0.010 inches.

4. The method as recited in claim 1, further comprising the steps of:
   removing said end plate from said connector by unfastening said end plate fasteners; and
   inspecting said bond line of said epoxy adhesive on said first and second bonding plates.

5. The method as recited in claim 1, further comprising the step of: preprocessing said first and second bonding plates by:
   i) chemical etching said first and second bonding plates;
   ii) rinsing said first and second bonding plates; and
   iii) oven drying said first and second bonding plates.

6. The method as recited in claim 1, further comprising the step of:
   preparing said epoxy adhesive characterized by mixing.

7. The method as recited in claim 1, further comprising the step of:

abrading and cleaning said open end of said composite tubing.

8. The method as recited in claim 1, further comprising the step of:
   uninstalling and removing said plurality of bonding plate fasteners.

9. The method as recited in claim 1, characterized in that said composite tubing is constructed of carbon fiber.

10. The method as recited in claim 1, characterized in that said composite tubing is generally rectangular.

11. The method as recited in claim 1, characterized in that said end plate fasteners and said bonding plate fasteners are threaded bolt fasteners.

\* \* \* \* \*